United States Patent [19]
Chen

[11] Patent Number: 5,739,776
[45] Date of Patent: Apr. 14, 1998

[54] KEY SWITCH ARRANGEMENT FOR COMPUTER KEYBOARDS

[75] Inventor: Frank Chen, Taipei, Taiwan

[73] Assignee: Silitek Corporation, Taipei, Taiwan

[21] Appl. No.: 693,503

[22] Filed: Aug. 8, 1996

Related U.S. Application Data

[63] Continuation of Ser. No. 437,971, May 10, 1995, abandoned.

[51] Int. Cl.$^6$ .................................................. H03M 11/00
[52] U.S. Cl. ........................ 341/22; 400/488; 400/486; 400/489; 341/20
[58] Field of Search ................................. 341/22, 23, 20; 400/486, 489, 488; 345/168

[56] References Cited

U.S. PATENT DOCUMENTS

| | | | |
|---|---|---|---|
| 4,522,518 | 6/1985 | Schmidt | 341/22 |
| 5,124,702 | 6/1992 | Van Ardenne | 341/22 |
| 5,231,380 | 7/1993 | Logan | 341/22 |
| 5,372,441 | 12/1994 | Louis | 341/22 |

Primary Examiner—Jeffery Hofsass
Assistant Examiner—Albert K. Wong
Attorney, Agent, or Firm—Browdy and Neimark

[57] ABSTRACT

A key switch arrangement for a computer keyboard of the type having a left key switch unit and a right key switch unit, the key switch arrangement including a chamber defined between the left key switch unit and the right key switch unit, a crescent spacebar and a tap key and a backspace key respectively mounted in the chamber between the left key switch unit and the right key switch unit, a power switch mounted in one key switch unit near the border, and a wrist pad at the front side for resting the wrists.

1 Claim, 8 Drawing Sheets

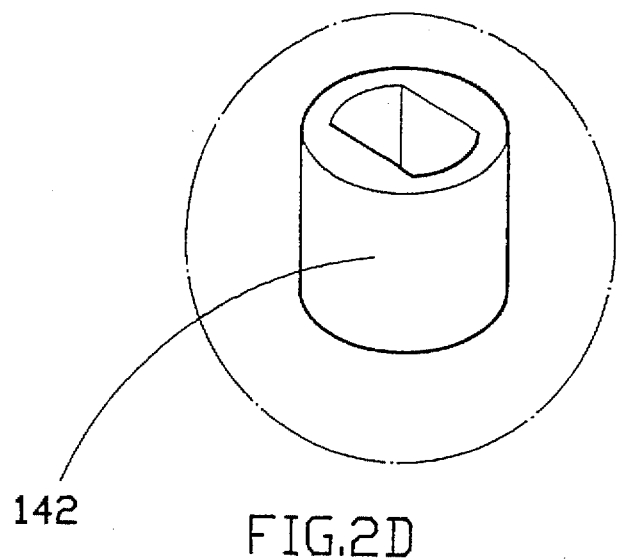
142   FIG.2D
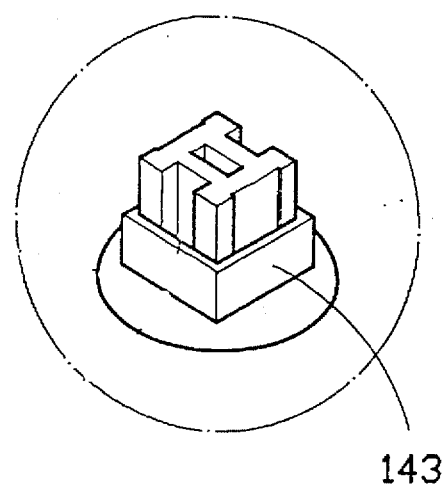
143
FIG.2E

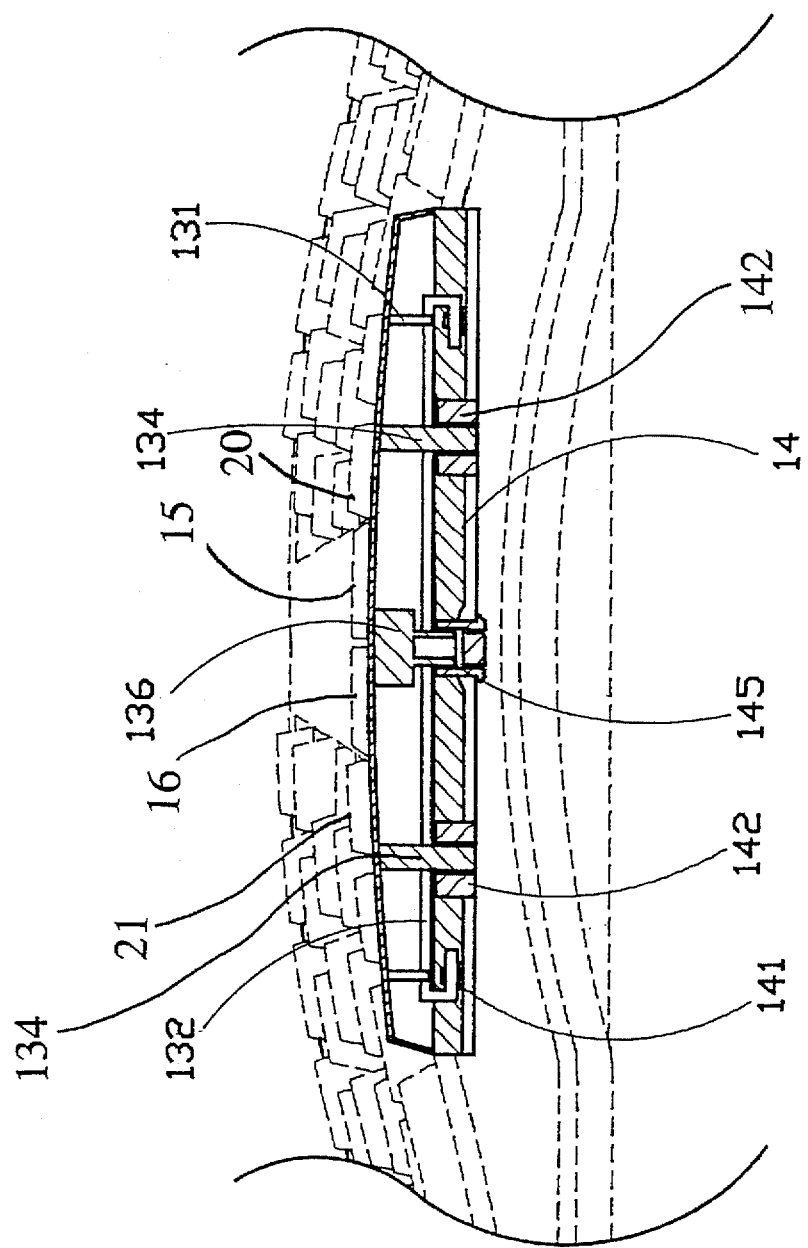

5,739,776

KEY SWITCH ARRANGEMENT FOR COMPUTER KEYBOARDS

This application is a continuation of application Ser. No. 08/437,971, filed may 10, 1995 now abandoned.

BACKGROUND OF THE INVENTION

The present invention relates to computer keyboards, and relates more particularly to the key switch arrangement of a computer keyboard in which the spacebar, the tab and the backspace are disposed between the left key switch unit and the right key switch unit near the front side for easy operation.

In designing a keyboard, versatile function and compact size are the main factors to attract consumers. In regular keyboards, the spacebar, the tab key, and the backspace key are commonly disposed at remote locations relative to one another. Therefore, the operator must move the hands here and there to operate different keys, causing the fingers of the hands to strike together. Furthermore, because the hands are suspended above the keyboard and moved here and there frequently, the operator will develop a pain in the hands quickly.

SUMMARY OF THE INVENTION

The present invention has been accomplished to provide a key switch arrangement for computer keyboards which eliminates the aforesaid problems. It is one object of the present invention to provide a key switch arrangement which permits the operator to operate the key switches with less effort. It is another object of the present invention to provide a key switch arrangement which permits the operator to operate the keyboard for a long length of time without developing a pain to the hands.

According to one aspect of the present invention, key switch arrangement comprises a chamber defined between the left key switch unit and the right key switch unit, a crescent spacebar and a tab key and a backspace key respectively mounted in the chamber between the left key switch unit and the right key switch unit, a power switch mounted in one key switch unit near the border.

According to another aspect of the present invention, a wrist pad is disposed at the front side of the keyboard for resting the wrists.

BRIEF DESCRIPTION OF THE DRAWINGS

FIG. 2D is an enlarged view taken on part D of FIG. 2;

FIG. 2E is an enlarged view taken on part E of FIG. 2;

FIG. 3 is a front view in section of the computer keyboard shown in FIG. 1;

DETAILED DESCRIPTION OF THE PREFERRED EMBODIMENT

Figure 1:
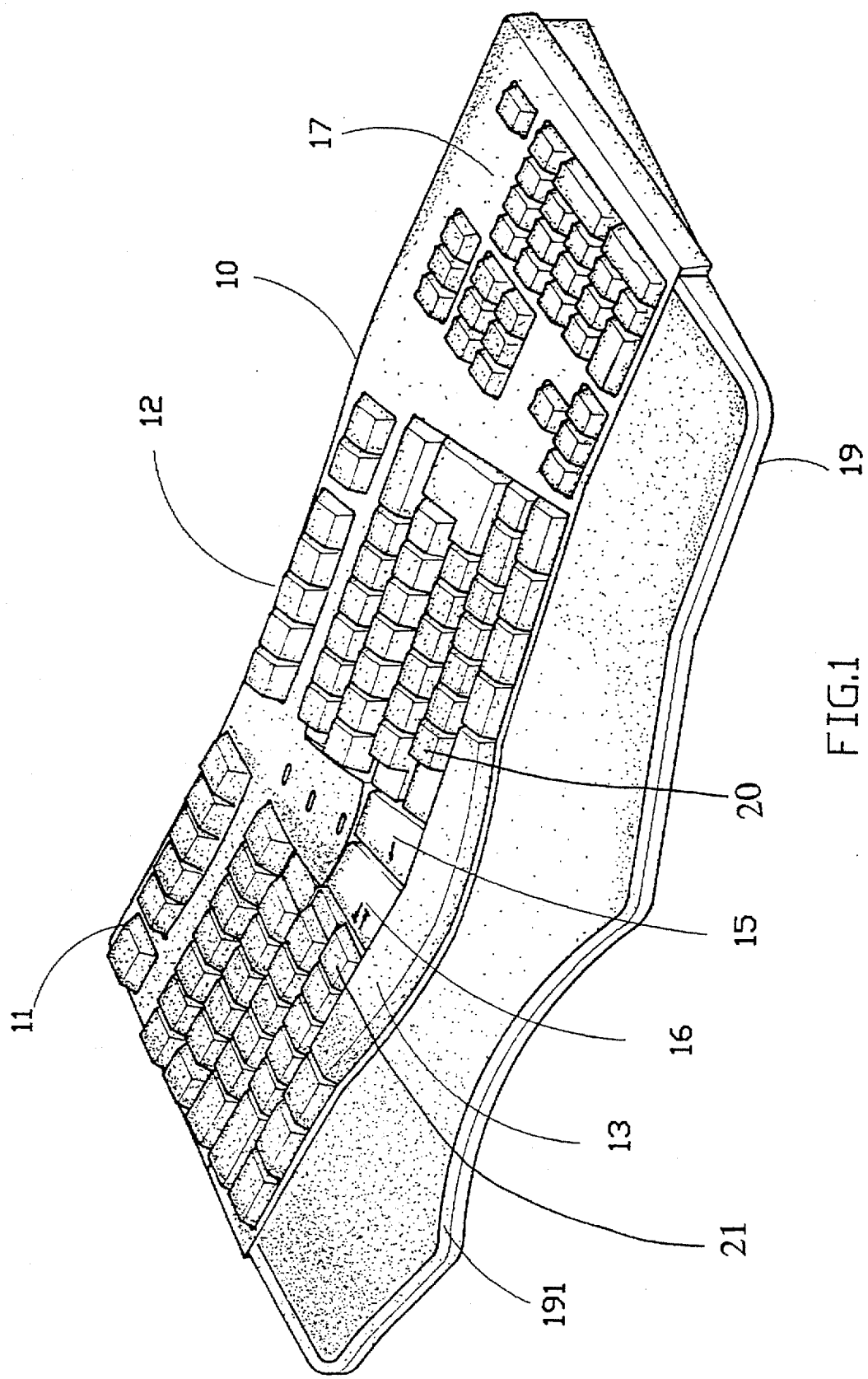
FIG. 1 is an elevational view of a computer keyboard according to the present invention.
Figure 2:
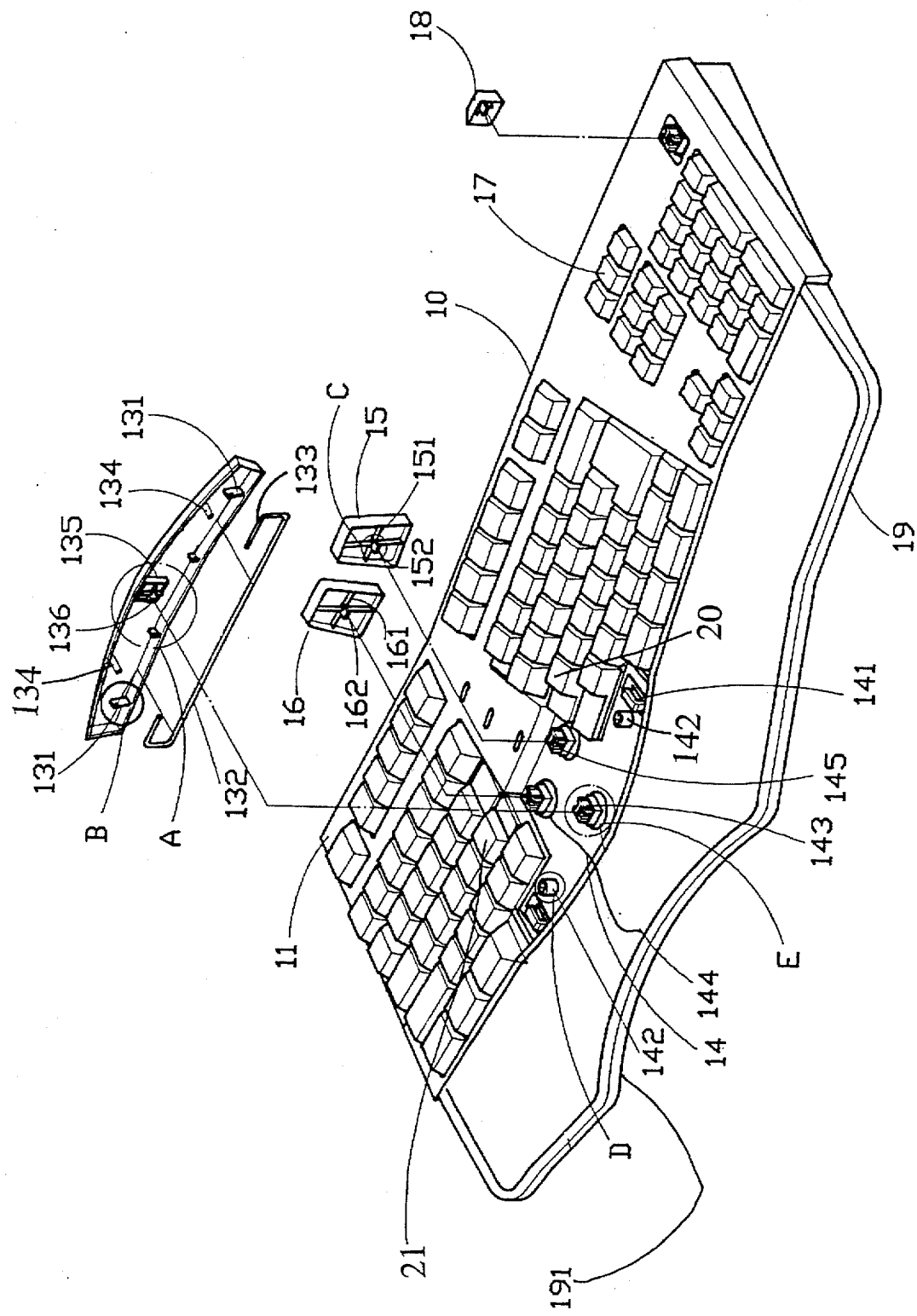
FIG. 2 is a dismantled view of the spacebar, the tab key and the backspace key according to the present invention.
Figure 2A:
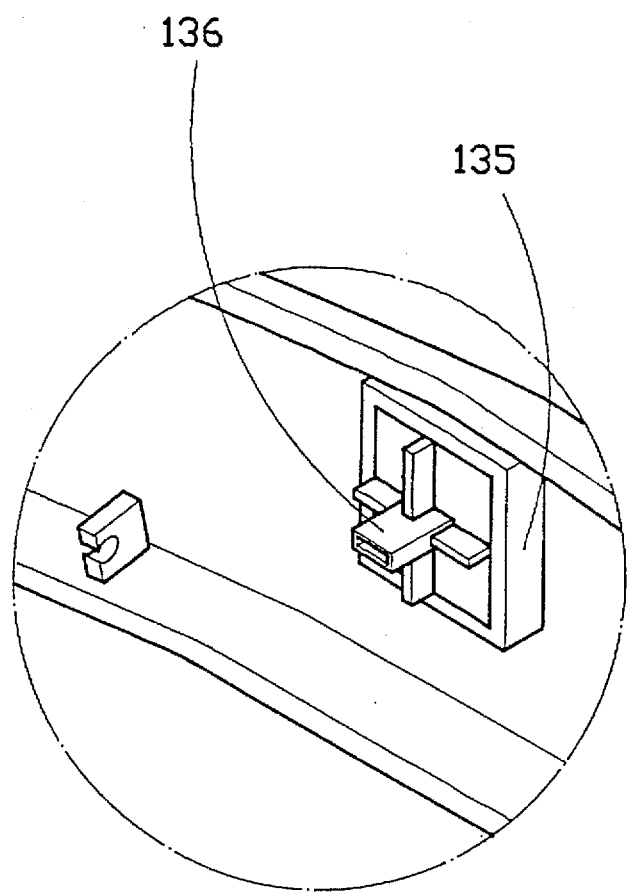
FIG. 2A is an enlarged view taken on part A of FIG. 2.
Figure 2B:
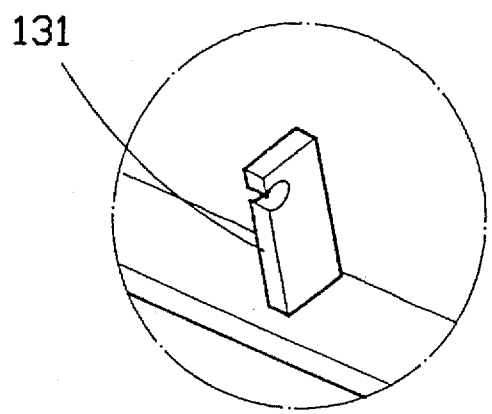
FIG. 2B is an enlarged view taken on part B of FIG. 2.
Figure 2C:
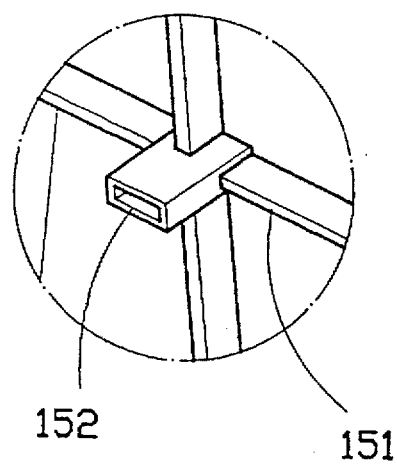
FIG. 2C is an enlarged view taken on part C of FIG. 2.

Referring to FIGS. 1, 2, and 3, the keyboard, referenced by 10, comprises a left key switch unit 11, a right key switch unit 12, a chamber 14 transversely disposed between the left key switch unit 11 and the right key switch unit 12 near the front side (the operator's side), a crescent spacebar 13 and a tab key 15 and a backspace key 16 respectively mounted in the chamber 14, a function key switch unit 17 at the right side remote from the left key switch unit 11, a power switch 18 in the function key switch unit 17 for power on/off control, a wrist pad 19 at the front side, which has a inwardly curved edge 191 in the middle.

The spacebar 13 comprises two retainer rods 131 at the bottom near two opposite ends, a balance bar 132 supported between the retainer rods 131 and having two opposite ends bent inwards toward each other and respectively inserted into a respective guide hole 141 in the chamber 14, a crossed rib 135 at the bottom between the retainer rods 131, a plug rod 136 raised from the crossed rib 135 for connection to a respective key switch holder 143 in the chamber 14. As shown in FIG. 3, the spacebar 13 also has two plug rods 134 which respectively engage in corresponding sockets 142 the chamber 146. The tab key 15 has a crossed rib 151 at the bottom and a plug rod 152 raised from the crossed rib 151 for connection to a respective key switch 145 in the chamber 14. The backspace key 16 has a crossed rib 161 at the bottom and a plug rod 162 raised from the crossed rib 161 for connection to a respective key switch 144 in the chamber 14. As shown in FIGS. 1, 2, and 3, key switches 143, 144 and 145 substantially identical and are located in chamber 14 so as to permit, an upper surface of tab key 15 and backspace key 16 to be below an upper surface of adjacent keys 20, 21 in the left key switch unit and the right key switch unit.

Figure 4:
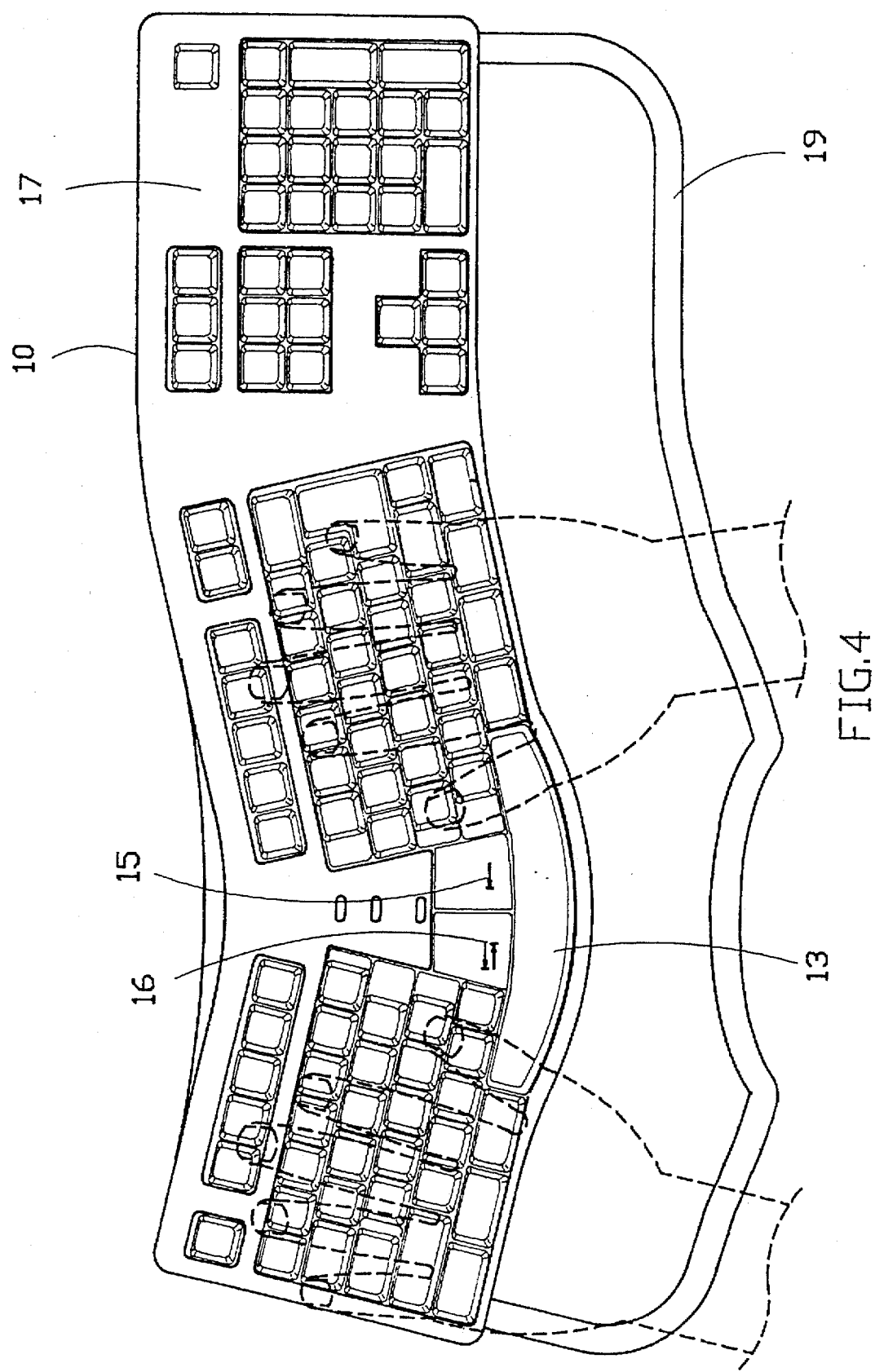
FIG. 4 is a top plain view of the computer keyboard shown in FIG. 1.

Referring to FIG. 4, the pitch between the left key switch unit 11 and the right key switch unit 12 gradually increasing toward the wrist pad 19, therefore the operator can operate the key switches in the most comfortable way by supporting the wrists on the wrist pad 19. Because the tab key 15 and the backspace key 16 are installed in the chamber 14 between the left key switch unit 11 and the right key switch unit 12 behind the spacebar 13, the operator can operate the tab key 15 and the backspace key 16 without lifting the hands from the wrist pad 19.

Figure 5:
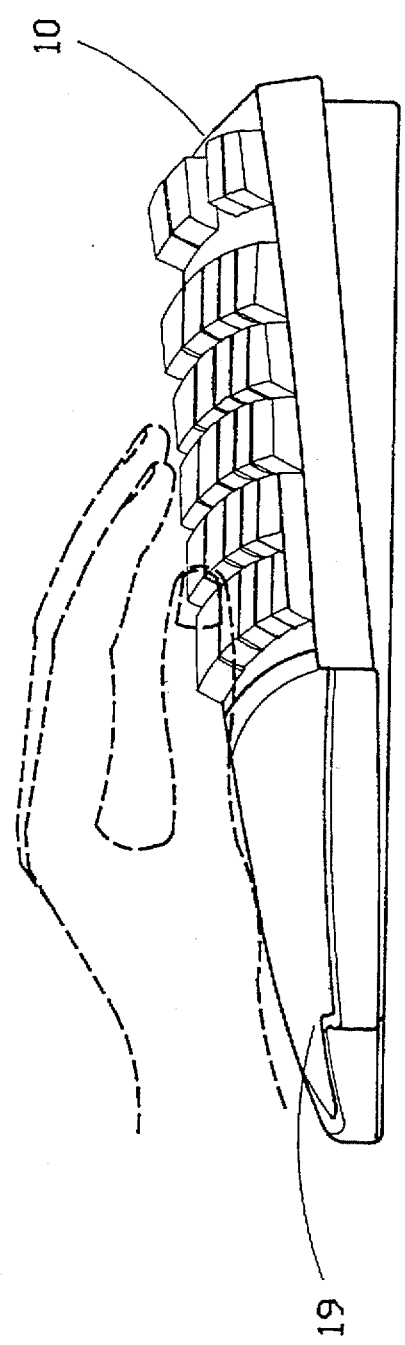
FIG. 5 is a side elevational view of the computer keyboard shown in FIG. 1 when operated.

Referring to FIG. 5, the wrist pad 19 is disposed at the front side of the keyboard 10 for the resting of the wrists during the operation. The size and shape of the wrist pad 19 are designed for resting the wrists comfortably. When the operator operates the key switches of the keyboard 10, the wrists are constantly supported on the wrist pad 19, therefore the operator does not have any pain in the hands after a long operation.

It is to be understood that the drawings are designed for purposes of illustration only, and are not intended as a definition of the limits and scope of the invention disclosed.

I claim:

1. A key switch arrangement on a computer keyboard for actuation by a user comprising:

a left and a right key switch unit;

a chamber defined between the left and right switch units;

a crescent space bar; a tab key and a backspace key located in the chamber;

mounting means for respectively engaging the crescent space bar, the tab key and the backspace key side-by-side within the chamber wherein the upper surface of the tab key and the backspace key are below the upper surfaces of adjacent keys in the left and right key switch units;

a power switch mounted near an outside border of the key switch arrangement; and a wrist pad disposed at the front side of the chamber for resting the wrists of the user wherein the crescent space bar, the tab key and the back space key are all within reach of the hand of the user when the wrists rest on the wrist pad.

* * * * *